(12) United States Patent　　(10) Patent No.:　US 12,696,100 B2
Saravanan et al.　　(45) Date of Patent:　Jul. 28, 2026

(54) DETERMINING ALLOCATION OF UNMANNED AERIAL VEHICLE BASE STATIONS IN A WIRELESS NETWORK

(71) Applicant: Telefonaktiebolaget LM Ericsson (PUBL), Stockholm (SE)

(72) Inventors: M Saravanan, Chennai (IN); K M Bharathvaj, Chennai (IN); Ahsan Javed Awan, Vallentuna (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 314 days.

(21) Appl. No.: 18/557,344

(22) PCT Filed: Jul. 12, 2021

(86) PCT No.: PCT/SE2021/050720
§ 371 (c)(1),
(2) Date: Oct. 26, 2023

(87) PCT Pub. No.: WO2022/231491
PCT Pub. Date: Nov. 3, 2022

(65) Prior Publication Data
US 2024/0224063 A1　　Jul. 4, 2024

(30) Foreign Application Priority Data
Apr. 26, 2021　(IN) .............................. 202141019080

(51) Int. Cl.
H04W 16/18　　(2009.01)

(52) U.S. Cl.
CPC ................................... H04W 16/18 (2013.01)

(58) Field of Classification Search
None
See application file for complete search history.

(56) References Cited

U.S. PATENT DOCUMENTS

2019/0087388 A1　3/2019　Venturelli et al.
2020/0327382 A1*　10/2020　Otto ....................... G06V 20/17
(Continued)

FOREIGN PATENT DOCUMENTS

CN　　111683375 A　　9/2020
CN　　111782388 A　　10/2020
(Continued)

OTHER PUBLICATIONS

Yin, Resource Allocation and Basestation Placement in Downlink Cellular Networks Assisted by Multiple Wireless Powered UAVs, Feb. 2020, IEEE Transactions on Vehicular Technology, vol. 69, No. 2.*

(Continued)

*Primary Examiner* — Chirag G Shah
(74) *Attorney, Agent, or Firm* — Baker Botts L.L.P.

(57) ABSTRACT

Methods and apparatus are provided. In an example aspect, a method of determining allocation of unmanned aerial vehicle (UAV) base stations in a wireless network is provided. The method further comprises expressing determination of allocation of UAV base stations to a one or more wireless communication devices in the wireless network as a quadratic unconstrained binary optimization (QUBO) problem, and executing the QUBO problem on a quantum computing device to determine the allocation of UAV base stations to a one or more wireless communication devices in the wireless network.

17 Claims, 10 Drawing Sheets

(56) References Cited

U.S. PATENT DOCUMENTS

| | | | | |
|---|---|---|---|---|
| 2020/0351666 A1* | 11/2020 | Mohen Venkatakrishnan | ............. H04W 16/02 | |
| 2020/0380877 A1* | 12/2020 | James | ...................... | G08G 5/56 |
| 2021/0027634 A1* | 1/2021 | Li | ........................... | G08G 5/32 |
| 2022/0222312 A1* | 7/2022 | Mandal | ................... | G06F 17/11 |
| 2022/0253504 A1* | 8/2022 | Mandal | ................... | G06F 17/16 |

FOREIGN PATENT DOCUMENTS

| | | | | |
|---|---|---|---|---|
| CN | 111835401 A | 10/2020 | | |
| CN | 112543050 A | 3/2021 | | |
| WO | WO-2018170027 A1 * | 9/2018 | ............. | G06N 5/01 |
| WO | 2019064050 A1 | 4/2019 | | |
| WO | WO-2022053149 A1 * | 3/2020 | ............. | G06F 17/11 |

OTHER PUBLICATIONS

Haibo Wang et al., "Modeling Multiple Unmanned Aerial Vehicles Placement Problem in Ad Hoc Network via Quadratic Unconstrained Binary Optimization" 2013 International Conference on Unmanned Aircraft Systems (ICUAS), May 28-31, 2013, Grand Hyatt Atlanta, Atlanta, GA.

Sanaa Sharafeddine and Rania Islambouli "On-demand deployment of multiple aerial base stations for traffic offloading and network recovery" Department of Computer Science and Mathematics, Lebanese American University (LAU), Beirut, Lebanon—Jun. 22, 2018.

PCT International Search Report issued for International application No. PCT/SE2021/050720—Dec. 30, 2021.

PCT Written Opinion of the International Searching Authority issued for International application No. PCT/SE2021/050720—Dec. 30, 2021.

Extended European Search Report issued for Application No. / Patent No. 21939498.8-1206 / 4331299 PCT/SE2021050720—Mar. 28, 2025.

Seon-Geun Jeong et al. "Quantum Annealing-Based Sum Rate Maximization for Multi-UAV-Aided Wireless Networks", Feb. 25, 2025.

E. Lear et al., "Manufacturer Usage Description Specification", Internet Engineering Task Force (IETF); Request for Comments: 8520; ISSN: 2070-1721—Mar. 2019.

* cited by examiner

100

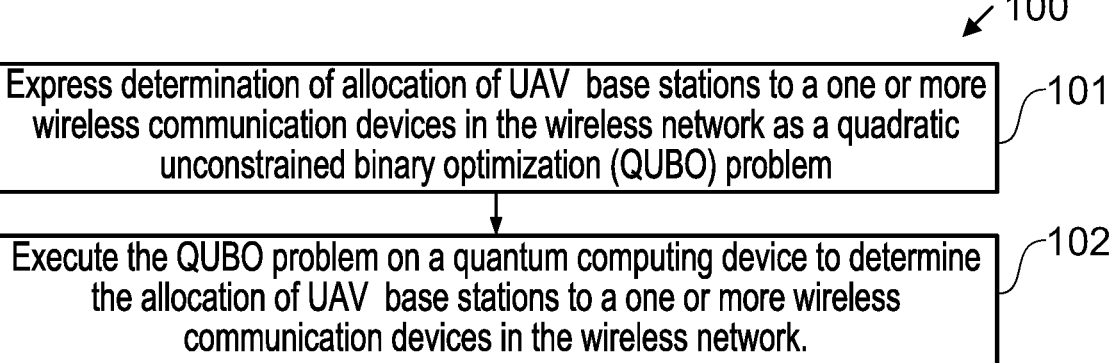

Express determination of allocation of UAV base stations to a one or more wireless communication devices in the wireless network as a quadratic unconstrained binary optimization (QUBO) problem ⌐101

Execute the QUBO problem on a quantum computing device to determine the allocation of UAV base stations to a one or more wireless communication devices in the wireless network. ⌐102

Express determination of allocation of channels in the wireless network as a quadratic unconstrained binary optimization (QUBO) problem　　301

Execute the QUBO problem on a quantum computing device to determine the allocation of channels in the wireless network.　　302

DETERMINING ALLOCATION OF UNMANNED AERIAL VEHICLE BASE STATIONS IN A WIRELESS NETWORK

PRIORITY

This nonprovisional application is a U.S. National Stage Filing under 35 U.S.C. § 371 of International Patent Application Serial No. PCT/SE2021/050720 filed Jul. 12, 2021 and entitled "DETERMINING ALLOCATION OF UNMANNED AERIAL VEHICLE BASE STATIONS IN A WIRELESS NETWORK" which claims priority to Indian Patent Application number 202141019080 filed Apr. 26, 2021, both of which are hereby incorporated by reference in their entirety.

TECHNICAL FIELD

Examples of the present disclosure relate to determining allocation of unmanned aerial vehicle (UAV) base stations in a wireless network, for example using a method that uses a quantum computing device. Further examples of the present disclosure relate to determining allocation of channels in a wireless network, wherein each of the channels in the wireless network are useable for wireless communication between base stations and wireless communication devices in the wireless network, and wherein at least one of the base stations is an unmanned aerial vehicle (UAV) base station, for example using a method that uses a quantum computing device.

BACKGROUND

Unmanned aerial vehicle (UAV) base stations are base stations that are mounted on UAVs, and may provide additional wireless connectivity in a wireless network when the wireless network is not able to handle the data requirements of the users of the wireless network. When this arises, UAV base stations can cooperatively work with the existing wireless network to provide additional radio resources to the users that require them.

It will be appreciated that as deployments of terrestrial wireless networks are generally planned based on long-term traffic behaviour, matching capacity of a wireless network with demand at all times may not be possible. This may cause either under-utilization of resources, or excess of capacity in the network. Therefore, a significant amount of resources may be left idle in certain sites while fluctuating demand cannot be satisfied in other sites. To avoid such shortcomings of existing wireless networks, UAV base stations may help move the excess capacity in a wireless network towards areas experiencing high demand such that network resources are utilized efficiently. This may also improve the quality of service (QOS) experienced in the wireless network. Limited incentives such as price reduction, or high data rate, may be offered to users with unsatisfactory coverage to encourage them to move towards the better coverage regions served by the UAV base stations. Furthermore, the mobility of UAV base stations allows them to move to wherever the demand is in the wireless network, as opposed to terrestrial cells waiting for demand to fall within the cell. Thus, it is desirable to find the coverage region providing the maximum revenue to the wireless network. It will also be appreciated that it is desirable to allocate the UAV base stations in such a manner to minimize congestion and/or overload in the wireless network.

SUMMARY

Prior problems relating to allocation of resources in a wireless network may require considerable computing resources to find an optimal solution. Therefore, speeding up allocation of unmanned aerial vehicle (UAV) base stations in a wireless network, and allocation of channels in a wireless network, are desired. Advantages to embodiments of this disclosure may include a considerable increase in the speed of such allocation.

A first aspect of the present disclosure provides a method of determining allocation of unmanned aerial vehicle (UAV) base stations in a wireless network. The method comprises expressing determination of allocation of UAV base stations to a one or more wireless communication devices in the wireless network as a quadratic unconstrained binary optimization (QUBO) problem. The method also comprises executing the QUBO problem on a quantum computing device to determine the allocation of UAV base stations to a one or more wireless communication devices in the wireless network.

Another aspect of the present disclosure provides apparatus for determining allocation of unmanned aerial vehicle (UAV) base stations in a wireless network. The apparatus comprises a processor and a memory. The memory contains instructions executable by the processor such that the apparatus is operable to express determination of allocation of UAV base stations to a one or more wireless communication devices in the wireless network as a quadratic unconstrained binary optimization (QUBO) problem, and execute the QUBO problem on a quantum computing device to determine the allocation of UAV base stations to a one or more wireless communication devices in the wireless network.

A further aspect of the present disclosure provides apparatus for determining allocation of unmanned aerial vehicle (UAV) base stations in a wireless network. The apparatus is configured to express determination of allocation of UAV base stations to a one or more wireless communication devices in the wireless network as a quadratic unconstrained binary optimization (QUBO) problem, and execute the QUBO problem on a quantum computing device to determine the allocation of UAV base stations to a one or more wireless communication devices in the wireless network.

A second aspect of the present disclosure provides a method of determining allocation of channels in a wireless network, wherein each of the channels in the wireless network are useable for wireless communication between base stations and wireless communication devices in the wireless network, and wherein at least one of the base stations is an unmanned aerial vehicle (UAV) base station. The method comprises expressing determination of allocation of channels in the wireless network as a quadratic unconstrained binary optimization (QUBO) problem. The method also comprises executing the QUBO problem on a quantum computing device to determine the allocation of channels in the wireless network.

Another aspect of the present disclosure provides apparatus for determining allocation of channels in a wireless network, wherein each of the channels in the wireless network are useable for wireless communication between base stations and wireless communication devices in the wireless network, and wherein at least one of the base stations is an unmanned aerial vehicle (UAV) base station. The apparatus comprise a processor and a memory. The memory contains instructions executable by the processor such that the apparatus is operable to express determination of allocation of channels in the wireless network as a quadratic unconstrained binary optimization (QUBO) problem, and execute the QUBO problem on a quantum computing device to determine the allocation of channels in the wireless network.

A further aspect of the present disclosure provides apparatus for determining allocation of channels in a wireless network, wherein each of the channels in the wireless network are useable for wireless communication between base stations and wireless communication devices in the wireless network, and wherein at least one of the base stations is an unmanned aerial vehicle (UAV) base station. The apparatus is configured to express determination of allocation of channels in the wireless network as a quadratic unconstrained binary optimization (QUBO) problem, and execute the QUBO problem on a quantum computing device to determine the allocation of channels in the wireless network.

Advantages to embodiments of this disclosure may include a considerable increase in the speed of finding solutions, such as an optimal solutions, to the aforementioned allocation problems.

BRIEF DESCRIPTION OF THE FIGURES

For a better understanding of examples of the present disclosure, and to show more clearly how the examples may be carried into effect, reference will now be made, by way of example only, to the following Figures in which:

FIG. 1 is a flow chart of an example of a method 100 of determining allocation of unmanned aerial vehicle (UAV) base stations in a wireless network;

DETAILED DESCRIPTION

Figure 2:
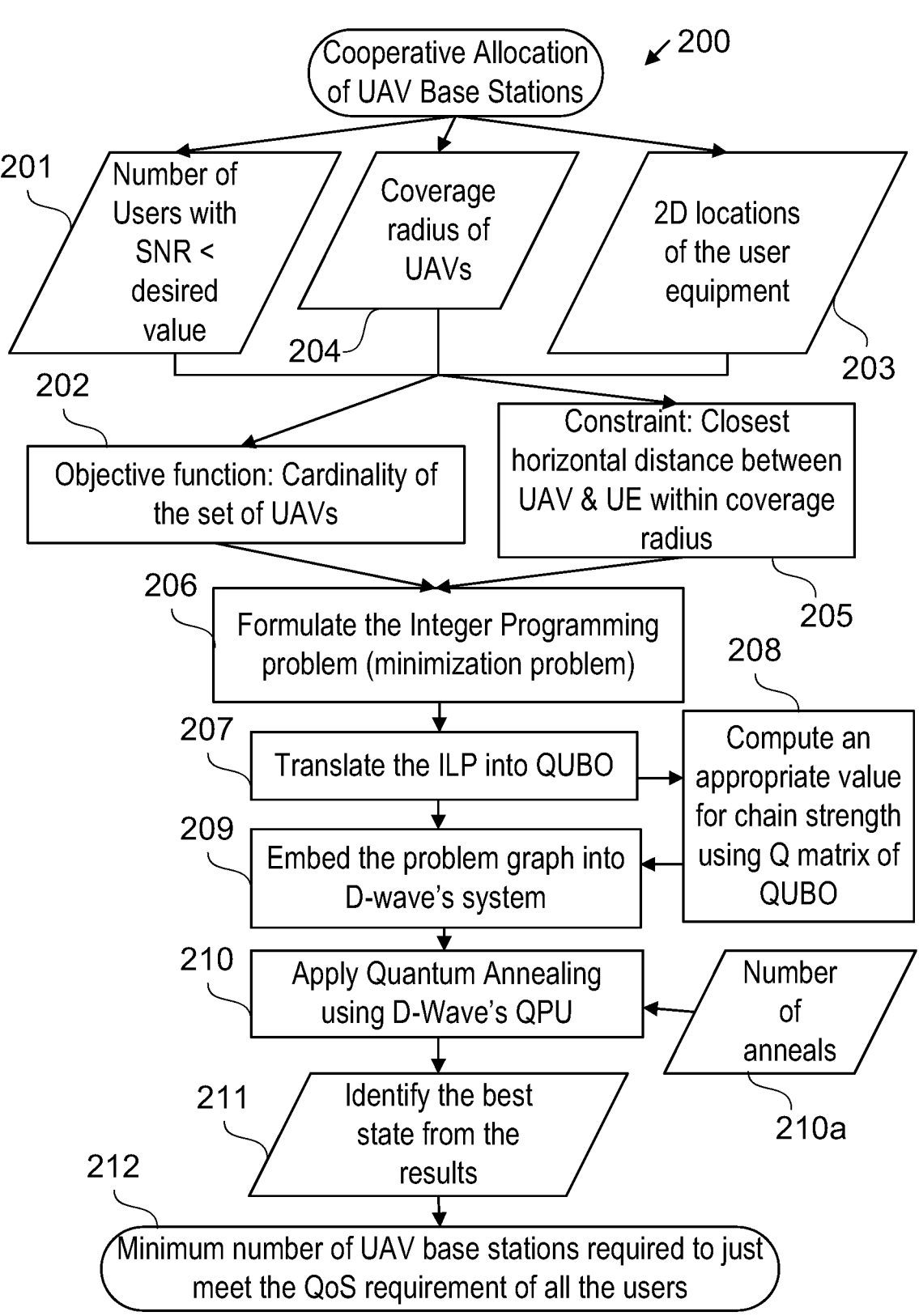
FIG. 2 is a flow chart of an example of a further method 200 of determining allocation of unmanned aerial vehicle (UAV) base stations in a wireless network.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAS, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

An optimal allocation of UAV base stations may be achieved by minimizing a number of UAV base stations needed to satisfy the Quality of Service (QOS) requirements for a group of distributed ground users who are experiencing service quality degradation (where it is assumed that each ground user is within the communication range of at least one UAV base station). For example, the UAV base stations may be allocated in such a manner that the data traffic at each base station in the wireless network is reduced, thereby improving the spectral efficiency, power efficiency, user data rate, coverage area, capacity per area and additionally reducing transmission delay and cost. Furthermore, in some examples, the UAV base stations may be allocated in such a manner such that probable new churners within service providers are avoided. It will be appreciated that each UAV base station may be placed such that the UAV base station serves as many unserved ground users as possible by providing higher priority to ground users near the coverage boundary of the UAV base station such that the occurrence of outstanding users that require one dedicated UAV base station for their wireless connectivity is minimized.

It will be appreciated that the aforementioned optimization problem is considered to be an NP-hard problem. The optimization problem may be formulated as a series of combinatorial optimization problems with corresponding objectives and related constraints. When executed classically, these combinatorial optimization problems take exponentially increasing execution times to produce optimal and near-optimal solutions to the problems. Additionally, when the problem size exceeds a particular limit, the problem can also become intractable. These optimization problems may therefore require considerable computing resources in order to find an optimal solution.

Quantum computers have revolutionized the way in which certain problems may be solved, in particular those problems that belong to the class of NP-hard. In particular, a metaheuristic procedure called quantum annealing has been found to be very effective in solving combinatorial optimization problems, where the goal is to find a particular combination of arguments or variables among many possible combinations that results in a global extremum of a function. If an optimization problem such as the optimal way to allocate UAV base stations in a wireless network, or the optimal way to allocate of channels in a wireless network, can be framed as an energy minimization problem, then a quantum annealing process can be used for example to find the low-energy states of the problem and hence the optimal or near-optimal combination of variables by exploiting the effects of quantum physics.

It will be appreciated that the terms user, user equipment, and wireless communication device may be used interchangeably throughout the disclosure. Furthermore, terms such as coverage region, area, site and cell may be used interchangeably.

For a quantum system, a Hamiltonian is a function which maps certain states, called eigenstates, to the corresponding eigen energies, and the collection of these make up the eigen spectrum. This Hamiltonian can be viewed as the sum of two terms: (i) initial Hamiltonian whose lowest-energy state is when all the qubits are in a superposition state of 0 and 1; and (ii) final Hamiltonian or problem Hamiltonian whose lowest-energy state is the solution to the problem that we are trying to solve. In quantum annealing, we begin in the lowest-energy eigenstate of the initial Hamiltonian. In an example annealing process, we gradually increase the influence of the problem Hamiltonian, which contains the qubit biases and coupling strengths between qubits, and we gradually decrease the influence of the initial Hamiltonian and at the end of it, we will be in the eigenstate of the problem Hamiltonian. Ideally, we have stayed in the minimum energy state throughout the quantum annealing process so that, by the end of the process, we are in the minimum energy state of the problem Hamiltonian and therefore have a solution to the problem we want to solve. In some examples, by the end of the quantum annealing process, each qubit is a classical object.

In examples of this disclosure, the allocation problems for determining allocation of unmanned aerial vehicle (UAV) base stations in a wireless network, and for determining allocation of channels in a wireless network, may be presented as combinatorial optimization problems. The problems may be transformed to a quadratic unconstrained binary optimization (QUBO) problems that can be naturally embedded on and solved directly by a quantum computing device such as a quantum annealing device, which works based on quantum mechanical phenomena such as superposition, entanglement and quantum tunneling.

A QUBO problem is defined for example using an upper triangular matrix Q of size N×N with N being the number of logical qubits and a binary vector $x=(x_1 \ x_2 \ \ldots \ x_N)^T$, as minimizing the following energy function E:

$$E(Q, x) = \sum_i Q_{i,i} x_i + \sum_{i<j} Q_{i,j} x_i x_j \qquad (1)$$

where $x_i \in \{0,1\}$ and $Q_{ij} \in \mathbb{R}$, i, j=1, 2, . . . , N. Each output decision variable $x_i$ represents the measured value (classical) of a logical qubit. The main diagonal elements $Q_{ii}$ of the matrix Q are the linear coefficients in the function E which represents the qubit biases, and the off-diagonal elements $Q_{ij}$ of the matrix Q are the quadratic coefficients in the function E which represents the coupling strengths between neighboring qubits. Note that, $$x_i^2 = x_i$$

as $x_i \in \{0,1\}$.

This can be expressed more concisely in some examples as:

$$\min_{x \in \{0,1\}^N} x^T Q x$$

Mapping an optimization problem (such as for example a resource allocation problem) into the QUBO format in some examples may involve calculating the appropriate values of all the elements of the matrix Q such that a solution vector x that minimizes E will represent an optimal solution to the original non-QUBO optimization problem formulation, e.g. the problem of optimal or near-optimal allocation of UAV base stations in a wireless network, and/or the problem of optimal or near-optimal allocation of channels in a wireless network.

FIG. 1 is a flow chart of an example of a method 100 of determining allocation of unmanned aerial vehicle (UAV) base stations in a wireless network. The method comprises, in step 102, expressing determination of allocation of UAV base stations to a one or more wireless communication devices in the wireless network as a quadratic unconstrained binary optimization (QUBO) problem. Step 104 of the method 100 comprises executing the QUBO problem on a quantum computing device to determine the allocation of UAV base stations to a one or more wireless communication devices in the wireless network. This may comprise for example performing a quantum annealing process.

The quantum computing device may be for example a quantum annealer such as from D-Wave Systems Inc. An example of such a device is the D-Wave 2000Q, which may in some examples execute the QUBO problem. In other examples, the quantum computing device may be another type of quantum computing device. The quantum computing device may execute the QUBO problem in any suitable location, including for example local to the entity performing the method 100, at the same premises as the entity performing the method 100, or remote from the entity performing the method 100. In some examples, executing the QUBO problem on a quantum computing device may comprise sending instructions to the quantum computing device, which may be local or remote, to execute the QUBO problem.

In particular examples of the method 100, the method may further comprise defining an integer programming linear (ILP) problem for allocation of UAV base stations to the one or more wireless communication devices in the wireless network. The ILP problem may comprise for example an objective function and also the constraints described below in some examples. Expressing determination of allocation of UAV base stations to the one or more wireless communication devices in the wireless network as a QUBO problem may in some examples comprise expressing the ILP problem as the QUBO problem. In some examples, the ILP problem comprises a is a minimization problem of determining a respective subset of available UAV base stations in the wireless network so as to minimize a value of an objective function of the ILP problem, wherein the value of the objective function indicates a number of available UAV base stations to be allocated in the wireless network.

FIG. 2 is a flow chart of an example of a further method 200 of determining allocation of unmanned aerial vehicle (UAV) base stations in a wireless network.

In this particular example, the number of users in the wireless network who are to be served by the UAV base stations is denoted as K. In this example, the user set is denoted by K={1, 2, . . . , K} and the users are positioned at known locations given by {w_k}_(k∈ K), where {w_k}∈ R^(2×1) represents the two-dimensional (2D) coordinates of the k^th ground user on the horizontal plane.

In this example, it also assumed that the transmit power is fixed and the minimum required signal-to-noise ratio at the receiver for reliable communication is given. Under a line of sight model, the UAV-to-user channel power gain follows the free-space path-loss model, which is determined by the UAV-to-user link distance. It is also assumed that when the UAV base stations are at a given altitude H, their maximum coverage radius projected on the ground plane corresponding to the SNR threshold is specified by r.

It will be appreciated that each coverage area of each UAV base station in this example has a total bandwidth of B Hz, which will be shared by the active users of the coverage area. It will also be appreciated that in this example, time is slotted with slot lengths of $t_r$ sec, and that a terrestrial base station within the wireless network updates resource allocation every $t_r$ sec. It will also be appreciated that the resources in this example will be allocated by the base stations based on the channel quality, where said allocation will aims to maximize the spectral efficiency of the wireless network.

It will be appreciated that each user equipment in the wireless network will experience a different signal-to-noise ratio on each resource unit (where the signal-to-noise ratio is defined as the ratio of signal power to the noise power). In some embodiments, resource distribution between the users of the wireless network may occur based on certain metrics that are dependent on the quality of the channel being used each user which may be represented using a Channel Quality Indicator (CQI).

In this example, at each resource allocation slot, a model for resource allocation will prioritize an active user who is experiencing the highest channel quality. It will be appreciated that providing a certain quality of service (QOS) in a wireless network may be complex as a result of the time-varying nature of wireless channels in the wireless network, which may hinder predictions of performance and result in QoS violations. Supporting QoS in a wireless network may imply an adaptation to various applications, as a communication system will typically support a large set of different service, where different policies are employed for different services. Additionally, each traffic flow will have its own characteristics, and the service requirement of each user will also vary. Thus, in order to support the QoS for each user, in some examples, the system will have to account for user requirements, and then adjust resource allocation depending on those requirements and the communication environment. The resources of the wireless network are shared by multiple users, so it may be difficult to satisfy all the users of the wireless network. For example, improvement of the QoS of one user may result in degrading performance for other users. In order to enhance each user's performance in a balanced manner, it may be necessary to approach the QoS issue at a system level by formulating pertinent resource management problems.

It will be appreciated that it may be more challenging to support QoS in wireless networks than in wired networks. For example, user mobility, variance in noise and interference, and channel fading of wireless systems may make quality unstable and unpredictable. Therefore, it may not be practical to estimate the amount of resources required to satisfy the requirements of each user in a deterministic way. It will be appreciated that supporting QoS in a wireless network is an adaptive process to be done in compliance with applications as well as the channel states, which may complicate a resource management problem.

In a preprocessing step of the method 200, the signal-to-noise ratio (SNR) is measured for each user. Following this, depending on the QoS requirement of each of the users, the users whose SNR is below a respective satisfactory threshold are identified in step 201. Following this, it is determined that these identified users will be served by the UAV base stations. The UAV base stations will then provide the identified users with additional resource units such that all the users experience an SNR that meets each user's respective satisfactory threshold. In other words, the one or more wireless communication devices to be served by the allocated UAV base stations have resource requirements that cannot be met by the wireless network. Additionally, in this example, each of the one or more wireless communication devices are experiencing a signal to noise ratio (SNR) from a respective serving cell in the network that is below a threshold. It will be appreciated that the number of such identified users served by each UAV base station may depend on various parameters such as the user distribution, SNR requirement of those users and the capacity of the UAV base stations themselves. The placement of each UAV base station will also affect the number of users enclosed by the coverage region of the UAV base station, and the quality of the air-to-ground links. It will be appreciated that an air-to-ground channel will differ from a terrestrial channel due to a higher chance of line-of-sight (LoS) connectivity.

As noted above, the method 200 attempts to determine an allocation of UAV base stations in the wireless network such that the allocation comprises a minimum number of UAV base stations such that each user equipment is served by at least one UAV base station within its communication radius r. Thus, the method 200 of determining allocation of unmanned aerial vehicle (UAV) base stations in a wireless network comprises determining a minimum number of UAV base stations for serving the one or more wireless communication devices.

At step 202 of the method 200, the objective function for the aforementioned allocation problem is formed. In this example, the objective function that is formed is the cardinality of the set of the UAV base stations. This may be written as, where the set of UAV base stations to be allocated is denoted as the set M={1, 2, . . . , M}, as follows:

$$\min_{\{u_m\}_{m \in M}} |M|$$

$$\text{s.t. } \min_{m \in M} \|w_k - u_m\| \le r, \ \forall \ k \in \mathcal{K}$$

where |M|=M denotes the cardinality of the set $\mathcal{M}$, $u_m \in \mathbb{R}^{2 \times 1}$ denotes the horizontal coordinates of UAV base station m, and the Euclidean norm $\|w_k - u_m\|$ is the distance between the ground user k and UAV base station m projected on the ground plane.

Thus, in this example, the value of the objective function is based in part on characteristics of the respective subset of the available UAV base stations. However, it will be appreciated that, in other examples, the value of the objective function is based on one or more of the following: locations of the available UAV base stations, locations of the one or more wireless communication devices 203, and coverage radiuses of the available UAV base stations 204.

In some embodiments, the coefficients of the determined objective function may be used to determine a value of a Lagrangian multiplier that may act as a penalty.

In this example, the objective function is formed according to a first constraint 205. In this example, the first constraint 205 comprises that each of the one or more wireless communication devices is to be served by at least one UAV base station, and, for each of the one or more wireless communication devices, the wireless communication device is within the coverage radius of the respective at least one UAV base station.

At step 206 of the method 200, an integer programming linear (ILP) problem for allocation of UAV base stations to the one or more wireless communication devices in the wireless network is defined, that based on the aforementioned objective function and constraints. In this example, the ILP problem comprises a minimization problem of determining a respective subset of available UAV base stations in the wireless network so as to minimize a value of an objective function of the ILP problem, wherein the value of the objective function indicates a number of available UAV base stations to be allocated in the wireless network.

At step 207 of the method 200, the ILP problem is expressed as a QUBO problem. Thus, in the method 200, a step of expressing determination of allocation of UAV base stations to the one or more wireless communication devices in the wireless network as a QUBO problem comprises expressing the ILP problem as the QUBO problem. An example method for expressing a problem as a QUBO problem is described in greater detail with reference to FIG. 5.

At step 208, an appropriate value for chain strength is computed using the Q matrix of the QUBO problem. At step 209, the QUBO problem is embedded into the D-wave system. At step 210, quantum annealing is applied using D-Wave's QPU. It will be appreciated that the number of anneals 210a may be varied between appropriate values to obtain an optimal or near optimal solution to the aforementioned allocation problem. At step 211, the best state from the results of the execution of the quantum annealing process are identified. It will be appreciated that the best state may correspond to a minimum energy state of the obtained results, where the minimum energy state then corresponds to the optimal or near optimal solution to the aforementioned allocation problem. It will be appreciated that the best state will represent an allocation of a minimum number of UAV base stations required to meet the QoS requirement of all the identified users 212.

Following the execution of the method 200, UAV base stations in the wireless network may be allocated according to the result of executing the QUBO problem on the quantum computing device.

It will be appreciated that the determined allocation of the UAV base stations in the wireless network may result that some users are covered by more than one UAV base station. In such scenarios, possible inter-cell interference may need to be addressed. In some examples, this issue may be addressed by determining channel assignment following the determination of allocation of the UAV base stations. An example of such determination of channel assignment is now described in greater detail, though example embodiments of allocation of channels in this disclosure may in some examples be performed without previously determining (or changing) allocation of UAV base stations.

It will be appreciated that UAV base stations and terrestrial base stations within the wireless network may in some examples share the same set of communication channels for transmission. In some examples, due to a limited usable range of the frequency spectrum, it may be necessary to incorporate a frequency reuse mechanism that both enables a high SNR value for each of the users, such that the Quality of Service (QOS) requirement of each user is maintained, and that is also flexible to dynamic traffic requirements in the UAV base station coverage region.

It will be appreciated that, in order to facilitate such a channel assignment, the available limited number of channels in the radio frequency spectrum may in some examples need to be allocated among the various base stations (UAV and terrestrial) in an efficient manner such that certain constraints are satisfied. It will also be appreciated that, if the mutual separation between multiple base stations is sufficient enough to satisfy certain interference constraints, then these base stations may use a channel simultaneously, permitting the repeated use of the given frequency spectrum.

Figure 3:
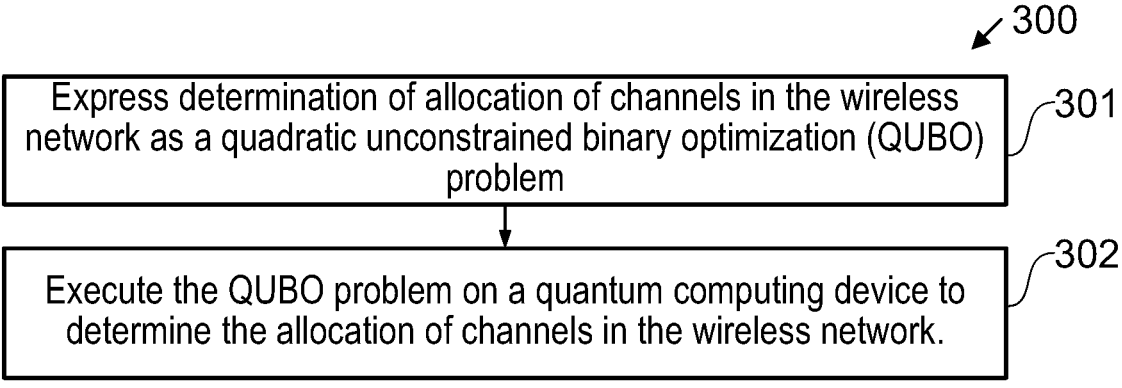
FIG. 3 is a flow chart of an example of a method 300 of determining allocation of channels in a wireless network.

FIG. 3 is a flow chart of an example of a method 300 of determining allocation of channels in a wireless network, wherein each of the channels in the wireless network are useable for wireless communication between base stations and wireless communication devices in the wireless network, and wherein at least one of the base stations is an unmanned aerial vehicle (UAV) base station. The method comprises, in step 302, expressing determination of allocation of channels in the wireless network as a quadratic unconstrained binary optimization (QUBO) problem. Step 304 of the method 300 comprises executing the QUBO problem on a quantum computing device to determine the allocation of channels in the wireless network. This may comprise for example performing a quantum annealing process.

As noted above, the Quantum computing device may be for example a quantum annealer such as from D-Wave Systems Inc. An example of such a device is the D-Wave 2000Q, which may in some examples execute the QUBO problem. In other examples, the quantum computing device may be another type of quantum computing device. The quantum computing device may execute the QUBO problem in any suitable location, including for example local to the entity performing the method 100, at the same premises as the entity performing the method 300, or remote from the entity performing the method 300. In some examples, executing the QUBO problem on a quantum computing device may comprise sending instructions to the quantum computing device, which may be local or remote, to execute the QUBO problem.

In particular examples of the method 300, the method may further comprise defining an integer programming linear (ILP) problem for allocation of channels in the wireless network. The ILP problem may comprise for example an objective function and also the constraints described below in some examples. Expressing determination of allocation of channels in the wireless network as a QUBO problem may in some examples comprise expressing the ILP problem as the QUBO problem. In some examples, the ILP problem comprises a minimisation problem of determining a respective subset of available channels in the wireless network to be assigned so as to minimise a value of an objective function for the ILP problem, wherein the value of the objective function indicates a number of violations on the interference constraints represented by a compatibility matrix C. The interference constraints and the compatibility matrix are described in greater detail with reference to the method 400.

Figure 4:
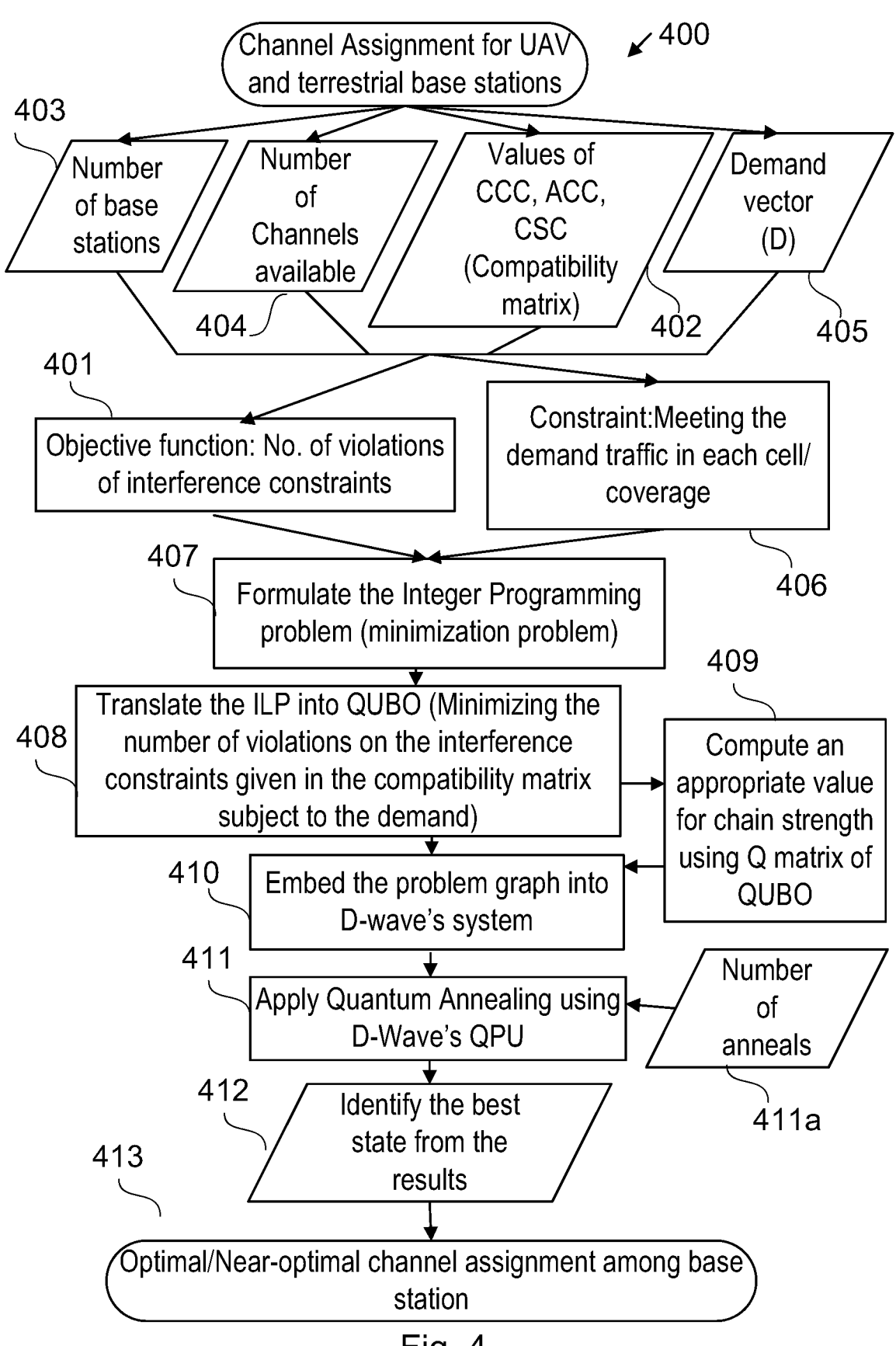
FIG. 4 is a flow chart of an example of a further method 400 of determining allocation of channels in a wireless network.

FIG. 4 is a flow chart of an example of a further example method 400 of determining allocation of channels in a wireless network.

In this particular example, it is assumed that the ground user locations are known, and the UAV base stations are at a fixed altitude H, while the UAV base station to user channels are dominated by line of sight links, and where the channel quality is dependent on the horizontal distance between the UAV base station and the user.

As noted above, certain types of interference (which may depend on the channel frequency and distance between the user and the base station) may be considered in the form of constraints. For example, a co-channel interference constraint may be considered that dictates that a channel cannot be allocated simultaneously to predetermined pairs of coverage regions. Additionally or alternatively, an adjacent channel interference constraint may be considered that dictates that adjacent channels cannot be allocated simultaneously to predetermined pairs of coverage regions. Additionally or alternatively, a co-site interference constraint may be considered that dictates that any pair of channels allocated to a particular coverage region must be separated by at least a predetermined frequency. As noted above, these interference constraints may be represented by a compatibility matrix C.

Thus, in this example, the method 400 aims to allocate the required number of frequency channels to each base station (UAV and terrestrial) in the network such that the demand of each cell and coverage region is fulfilled in a way that these aforementioned compatibility constraints are followed. In other words, the method 400 aims to solve the channel allocation problem in a manner which minimizes the severity of interference.

At step 401 of the method 400, the objective function for the aforementioned channel allocation problem is formed. In this example, the objective function is formed by first defining a set of binary variables, where $$x_{ij} = \begin{cases} 1, & \text{if channel } i \text{ is allocated to cell/coverage region } j \\ 0, & \text{otherwise} \end{cases}$$

$$\text{for } i = 1, 2, \ldots, M \text{ and } j = 1, 2, \ldots, N.$$

Following this, the objective function is defined as follows, which counts the number of violations on the aforementioned interference constraints that are represented by the compatibility matrix C 402:

$$\frac{1}{2} \sum_{\substack{(i,j),(i',j') \\ (i,j) \neq (i',j') \\ |i-i'| < c_{jj'}}} x_{ij} x_{i'j'}$$

The compatibility matrix C 402 is an N×N symmetric matrix where N is the total number of terrestrial base stations and UAV base stations in the wireless network 403, and $c_{ij}$ is the minimum frequency separation required between a channel in coverage region i and coverage region j.

If it is considered that the total number of available channels 404 is M, and the number of required channels for each coverage region is i, the number of required channels 405 may be presented by the demand vector $D=(d^i)$ where $1 \leq i \leq N$. It is then considered that $f_{ik}$ indicates the assigned channel frequency for the $k^{th}$ call in coverage region i where $1 \leq i \leq N$ and $1 \leq k \leq d_i$.

Following this, it is then considered that the condition for the compatibility constraints is:

$$|f_{ik} - f_{jl}| \geq c_{ij}$$

-continued
where $1 \leq i, j \leq N$, $1 \leq k \leq d_i$ and $1 \leq l \leq d_j$.

Therefore, the aforementioned channel assignment problem can now be solved by finding the value of $f_{ik}$ which satisfies the aforementioned constraint conditions given the total number of terrestrial base stations and UAV base stations in the network N, the demand vector D and the compatibility matrix C.

In this example, the objective function will become positive if two interfering coverage regions j and j' are assigned two channels i and i' within the respective interference bandwidth of $c_{jj'}$. It will be appreciated that, if all of the channel assignments follow the compatibility constraints represented by the matrix C, then the value of the objective function in these circumstances will be equal to zero. Therefore, in a situation in which the number of channels allocated to coverage region j differs from its demand traffic $d_j$ at any instance in time, this allocation will be penalized as the aforementioned constraints are not satisfied Thus, it is an aim of the method 400 in particular examples to minimize the objective function in order to solve the aforementioned channel assignment problem.

Therefore, in this example, the objective function is based on one or more of the following: a number of base stations in the wireless network, the number of available channels in the wireless network, a value of the co-channel interference constraint, a value of the adjacent channel interference constraint, a value of the co-site interference constraint, and traffic demands of wireless communication devices in each of the coverage regions to be served by the respective subset of available channels.

In some embodiments, the coefficients of the determined objective function may be used to determine a value of a Lagrangian multiplier that may act as a penalty.

In the method 400, the objective function is formed according to a first constraint 406. In this example, the first constraint 406 comprises that the respective subset of available channels in the wireless communication devices to be assigned must fulfil the demands of wireless communication devices in each of the coverage regions to be served by the respective subset of available channels. In other words, the demand in each of the coverage regions must be fulfilled by the resulting channel assignment.

This constraint may be mathematically expressed as follows:

$$\sum_j \left( \sum_i x_{ij} - \text{demand}_j \right)^2$$

where i=1, 2, . . . , M and j=1, 2, . . . , N.

In other words, in this example, the optimal or near-optimal assignment of channels to the cells and coverage regions in the network, should have the minimum number of violations on the interference constraints subject to the demand in each cell and coverage region of the wireless network.

At step 407 of the method 400, an integer programing linear (ILP) problem for allocation of channels in a wireless network is defined that based on the aforementioned objective function and constraints. In this example, the ILP problem comprises a minimisation problem of determining a respective subset of available channels in the wireless network to be assigned so as to minimise a value of an objective function for the ILP problem, wherein the value of the objective function indicates a number of violations on the interference constraints represented by a compatibility matrix C.

At step 408 of the method 400, the ILP problem is expressed as a QUBO problem. Thus, in the method 400, a step of expressing determination of allocation of channels in the wireless network as a QUBO problem comprises expressing the ILP problem as the QUBO problem. An example method for expressing a problem as a QUBO problem is described in greater detail with reference to FIG. 5.

At step 409, an appropriate value for chain strength is computed using the Q matrix of the QUBO problem. At step 410, the QUBO problem is embedded into the D-wave system. At step 411, quantum annealing is applied using D-Wave's QPU. It will be appreciated that the number of anneals 411$a$ may be varied between appropriate values to obtain an optimal or near optimal solution to the aforementioned allocation problem. At step 412, the best state from the results of the execution of the quantum annealing process are identified. It will be appreciated that the best state will represent an allocation of channels to the cells and coverage regions in the network, should have the minimum number of violations on the interference constraints subject to the demand in each cell and coverage region of the wireless network 413.

Following the execution of the method 400, channels in the wireless network may be allocated according to the result of executing the QUBO problem on the quantum computing device.

Figure 5:
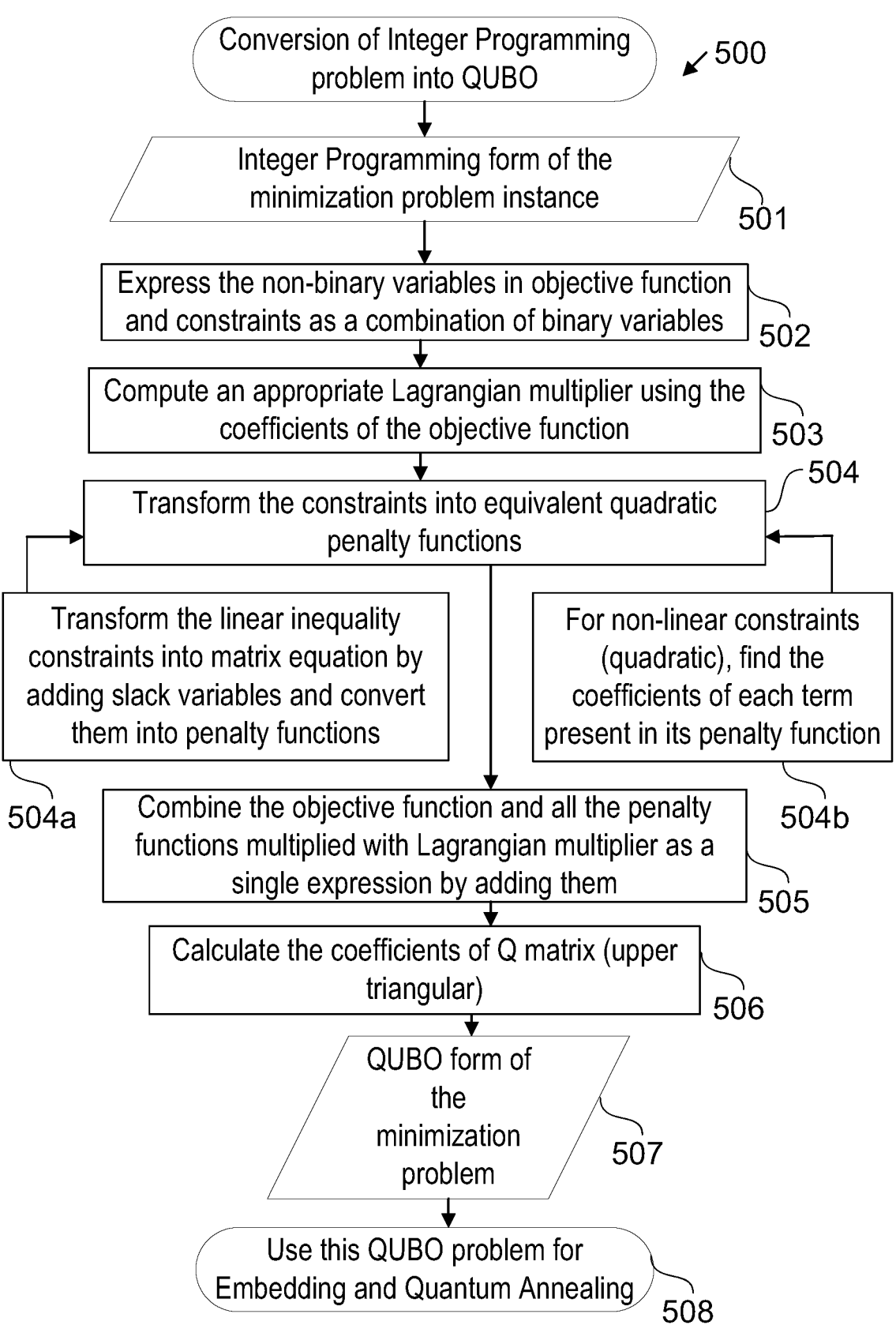
FIG. 5 shows an example of a method 500 of converting an ILP problem into a QUBO problem.

FIG. 5 shows an example of a method 500 of converting an ILP problem into a QUBO problem. It will be appreciated that this expression of an allocation problem as a QUBO problem may be applied to the expressions of the aforementioned allocation problems as QUBO problems according to the methods 100-400 described above.

At step 501 of the method 500, an integer programming form of the minimization problem instance is formed. At step 502, the non-binary variables in the objective function and the constraints are expressed as a combination of binary variables. At step 503, an appropriate Lagrangian multiplier is computed using the coefficients of the objective function.

At step 504, the constraints are transformed into equivalent quadratic penalty functions.

In some embodiments, transforming one or more constraints of the objective function into equivalent quadratic penalty functions comprises, for a linear constraint, adding one or more slack variables to the linear inequality constraint and expressing slack variable in terms of binary variables to convert the linear inequality constraint to a matrix equation form, and converting the matrix equation form to a quadratic penalty function, as shown at step 504$a$.

In some embodiments, transforming one or more constraints of the objective function into equivalent quadratic penalty functions comprises, for a non-linear inequality constraint, finding the coefficients of each term present in the penalty function of the non-linear inequality constraint, as shown at step 504$b$.

At step 505, the objective function and the penalty functions multiplied with the Lagrangian multiplier are combined as a single expression by addition.

At step 506, the coefficients of the upper triangular Q matrix are calculated. At step 507, the QUBO form of the minimization problem is formed.

The formed QUBO problem is then suitable for embedding and executing in a quantum annealing process. Therefore, in some embodiments, executing the QUBO problem on a quantum computing device may comprise performing a quantum annealing process 508.

In some embodiments, an appropriate value of a Lagrangian multiplier is calculated using the coefficients of the respective objective function. A model may then be formed which holds the objective function, and the relevant constraints are then added to this model. This results in a polynomial unconstrained binary optimization form of the relevant minimization problem which is a polynomial of degree 3. This polynomial unconstrained binary optimization form may then be converted to a second-degree polynomial in order to represent this model in a QUBO form. The Q matrix in the QUBO problem is then formed as an upper triangular matrix in this example, where this is a requirement to embed the problem using D-Wave and apply quantum annealing. As noted previously, an appropriate value for the chain strength may be computed using maximum and minimum values of the elements of the Q matrix, the chain strength may then be set such that the chain breaks are reduced.

Therefore, in some embodiments, expressing an ILP problem as a QUBO problem may comprise expressing the objective function and constraints of the ILP problem as a combination of binary variables, computing a Lagrangian multiplier using the coefficients of the objective function, transforming one or more constraints of the objective function into equivalent quadratic penalty functions, combining the expression containing only binary variables and the penalty functions into a single quadratic expression equivalent to the form x$^T$Qx, and determining the matrix Q from the quadratic expression, wherein the binary variables in the expression containing only binary variables represent logical qubits in a problem graph for the quantum computing device.

Figure 6:
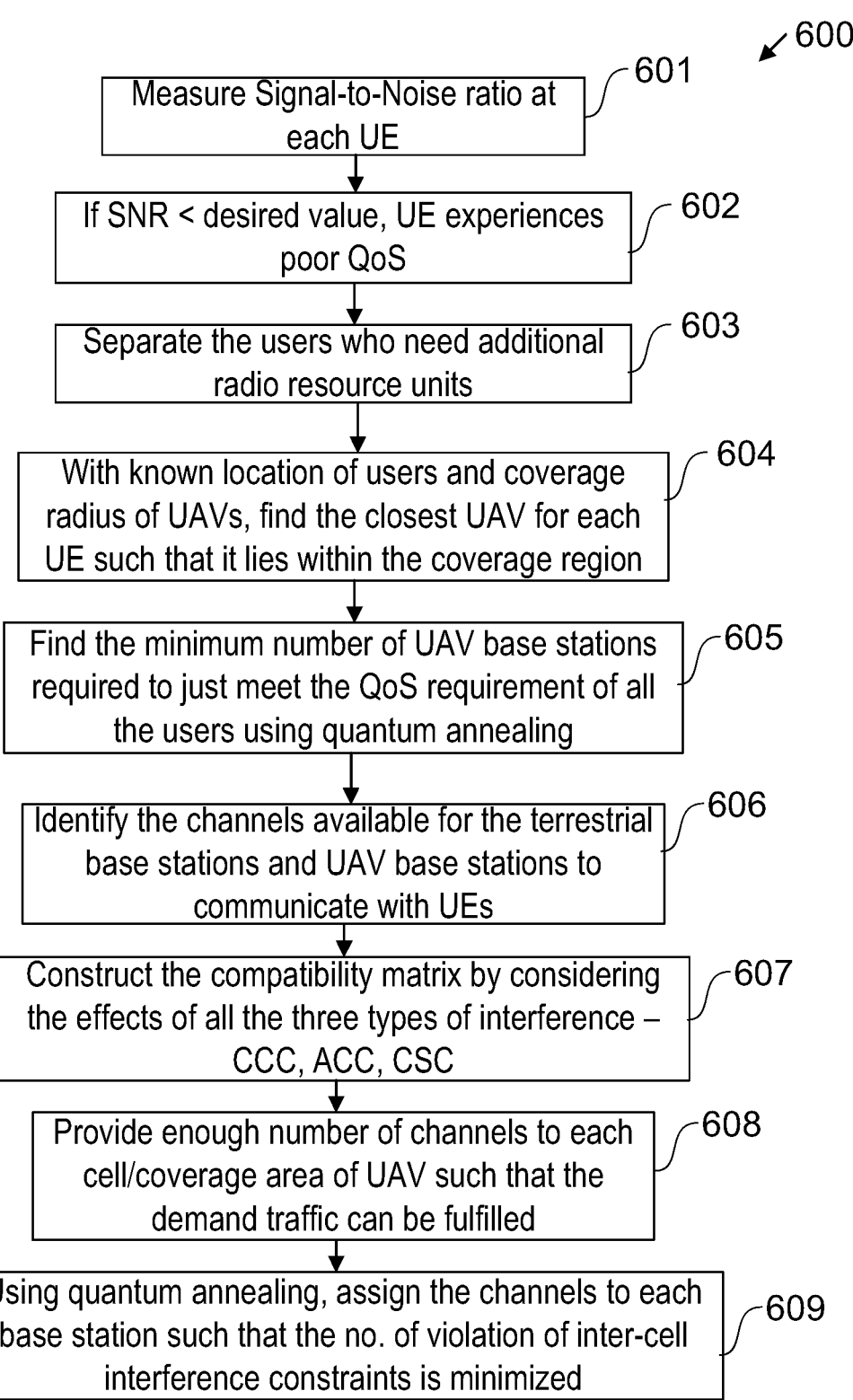
FIG. 6 shows an example of a method 600 of a more general allocation problem in a wireless network.

FIG. 6 shows an example of a method 600 of a more general allocation problem in a wireless network. It will be appreciated that the aforementioned UAV base station and channel allocation may be executed in succession as part of a larger wireless network optimization problem.

At step 601, the signal-to-noise ratio is measured for each user of the wireless network.

At step 602, for each of the users, it is determined whether the SNR for the user is below a satisfactory threshold for the user. If the SNR does fall below the satisfactory threshold, this may be indicative that the user is experiencing poor QoS. As noted above, the satisfactory threshold for the SNR for the user may vary between the users in some examples.

At step 603, the users for which the SNR does fall below the satisfactory threshold for the user are identified as requiring additional radio resource units.

At step 604, where both the locations of the users of the wireless network, and the coverage radii of each of the UAV base stations are known, the closest UAV base station for each of the identified users, such that the identified user lies in the coverage area of the closest UAV base station, are identified.

At step 605, the minimum number of UAV base stations required to meet the QoS requirements of all of the identified users are found using quantum annealing.

At step 606, the channels available for the terrestrial base stations and UAV base stations to communicate with users in the wireless network are identified.

At step 607, a compatibility matrix based on the aforementioned inference constraints is constructed.

At step 608, a number of channels are provided to each coverage area of each UAV base station such that demand traffic of the users within that coverage area can be fulfilled.

At step 609, channels are assigned to each base station such that the number of violations of the aforementioned inter-cell interference constraints are minimized, using quantum annealing.

Therefore, generally, the method 600 first measures the SNR at each user equipment in the wireless network. For each user equipment where the SNR is less than a desired value, said each user equipment are identified as experiencing poor QoS and requiring additional radio resource units. Where the locations of users and coverage radius of UAV base stations are known, the closest UAV base station for each user equipment is found such that the user equipment lies within the coverage region of the UAV base station. Following this the minimum number of UAV base stations required to meet the QoS requirement of all the identified users is found using quantum annealing. Following this, the channels available for the terrestrial base stations and UAV base stations to communicate with UEs in the wireless network are found. A sufficient number of channels are then provided to each cell and coverage area such that the demand traffic in each respective cell and coverage area can be fulfilled. Finally, quantum annealing is used to assign the channels to each base station in the wireless network such that the number of violations of inter-cell interference constraints is minimized The improved performance of the discussed quantum annealing methods for solving the aforementioned allocations problems may be compared with classical methods for solving said allocation problems. Three different meta-heuristic algorithms have been used to compare the aforementioned quantum annealing method with classic methods. The three algorithms are qubovert's simulated annealing, D-Wave's simulated annealer, and Tabu search.

It will be appreciated that such a comparison may be performed by assuming suitable values for all the inputs based on the limits. It will be appreciated that, in some examples, the limits correspond to the total number of binary variables that can be embedded on a D-Wave machine, and therefore set the upper limit of an allocation problem to be solved. For example, the below table for 5 different problem instances shows values of input parameters (bandwidth, total number of users, maximum demand in any cell, interference constraints) that have been chosen such that the size of each problem instance remains embeddable on the D-Wave.

Figure 7:
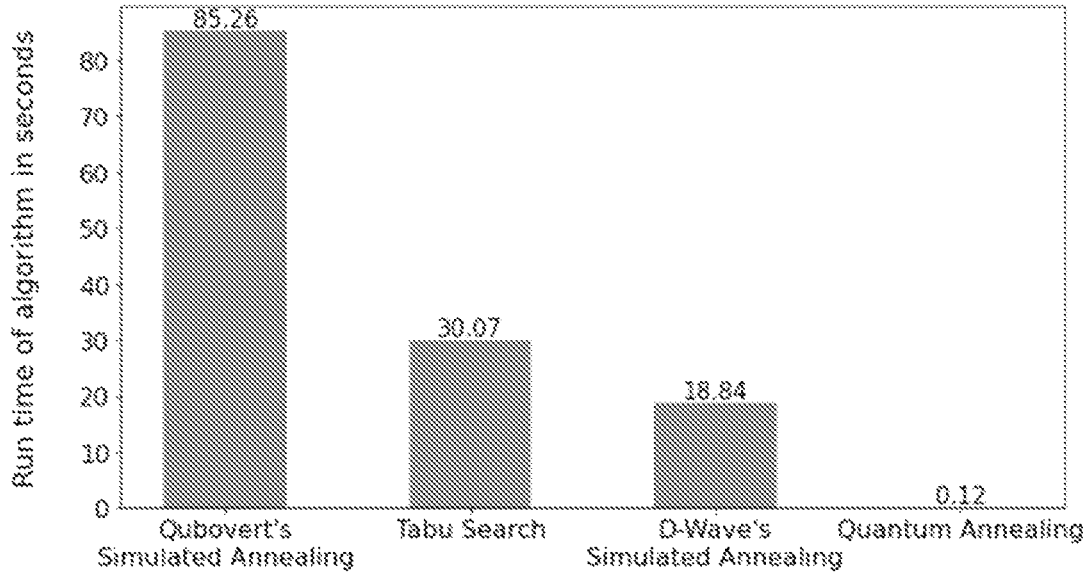
FIG. 7 shows time taken to complete a number anneals for a quantum annealing approach and a number of classical approaches.

The same experiment has been repeated with different values for the input variables, and the average performance of all the four algorithms including a classical algorithm is plotted in FIG. 7 for comparison. The execution times shown in FIG. 7 are the time taken to complete 100 anneals respectively for each approach. For qubovert's simulated annealing, the polynomial unconstrained binary optimization form constructed according to the methods 200 and 400 have been utilized. To run using D-Wave's Simulated Annealing sampler and also for Tabu Search, a Binary Quadratic Model (BQM) obtained from the aforementioned minimization problems have been utilized as inputs. For the quantum annealing process, the inputs provided to the QPU are the aforementioned QUBO forms and chain strength values. As shown in FIG. 7, the quantum annealing approach outperforms the classical algorithms.

A particular example implementation of the method of determining allocation of unmanned aerial vehicle (UAV) base stations in a wireless network is now described.

The values of input variables such as ground user locations (2D horizontal locations), altitude and coverage radius of the UAV base stations are assigned with appropriate values. For example, values for the ground user locations may be generated randomly from a discrete uniform distribution, where it may be assumed that all of the users lie in a square region of 3600 sq·m spanning 60 m in both the x and y directions. In this example, the randomly generated values will therefore lie within a range of [1, 60] in both the x and y directions.

In another example, the values of the coverage radius of a UAV base station may depend on the altitude at which the UAV base station is flying. In this example, it may be assumed that each of the UAV base stations are flying at a fixed altitude, and therefore only the value for the coverage radius needs to be considered, as the altitude variable does not vary between the UAV base stations. In these experiments, the coverage radius has been taken as 30 m.

In this example, the following experiment is performed with a system containing 3 UAV base stations and 10 user devices. As noted above, the output of this experiment is the minimum number of UAV base stations required such that the allocation meets the minimum desired signal-to-noise ratio for all the user devices.

FIG. 7 shows the average run time of the aforementioned algorithms solving the problem of determining allocation of unmanned aerial vehicle (UAV) base stations in a wireless network, where in this example the algorithms contains 568 binary variables. In this example, the quantum annealing was executed on the Advantage System 1.1 QPU whose underlying graph structure is the Pegasus topology. As illustrated in FIG. 7, the quantum annealing is able to find the optimal results of the aforementioned allocation problem quicker than the qubovert's simulated annealing, D-Wave's simulated annealer, and Tabu search algorithms.

Figure 8:
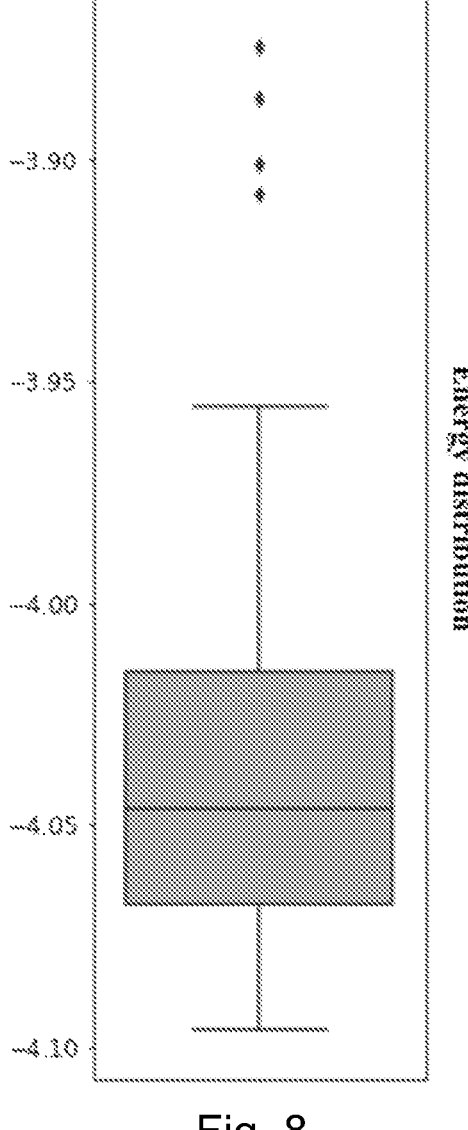
FIG. 8 shows an energy distribution returned at the end of a quantum annealing process.

FIG. 8 shows the energy distribution (in the order of $10^5$) returned at the end of the aforementioned quantum annealing process. The most optimum solution vector for the aforementioned UAV base station allocation problem corresponds to the state with the least energy in FIG. 8. As shown in FIG. 8, the majority of the solutions returned from the quantum annealing process lie near to the least energy in FIG. 8. Thus, the quantum annealing process is likely to return a near-optimal solution for the aforementioned UAV base station allocation problem.

Implementations of the method of determining allocation of channels in a wireless network are now described.

The following table represents 5 distinct implementations of determining allocation of channels in a wireless network, where the parameters for each implementation are as follows:

| Parameters | Problem Instance 1 | Problem Instance 2 | Problem Instance 3 | Problem Instance 4 | Problem Instance 5 |
|---|---|---|---|---|---|
| Bandwidth/Channel span | 22 | 22 | 20 | 25 | 24 |

-continued

| Parameters | Problem Instance 1 | Problem Instance 2 | Problem Instance 3 | Problem Instance 4 | Problem Instance 5 |
|---|---|---|---|---|---|
| Total number of users (in each cell) | 7 (2, 1, 3, 1) | 8 (2, 1, 4, 1) | 10 (3, 4, 1, 2) | 17 (7, 4, 2, 4) | 15 (6, 3, 2, 4) |
| Maximum demand in any cell | 3 | 4 | 4 | 7 | 6 |
| Interference constraints | CCC = 1, ACC = 3, CSC = 4, DC = 2 | CCC = 1, ACC = 3, CSC = 4, DC = 2 | CCC = 1, ACC = 3, CSC = 4, DC = 2 | CCC = 0, ACC = 3, CSC = 4, DC = 0 | CCC = 0, ACC = 3, CSC = 4, DC = 0 |
| Binary variables | 88 | 88 | 80 | 100 | 96 |

The following table represents the solutions for each of the five implementations of determining allocation of channels in a wireless network for Qubovert's simulated annealing, D-Wave's simulated annealing and quantum annealing respectively.

work. Additionally, these solutions provide the commercial benefits of business agility, reduction of costs, ease of deployment, infrastructure expansion, faster time-to-market along and reliable operations.

| | Objective function value (No. of violations to interference constraints) | | | | | All constraints satisfied (Traffic demand)? | | | | | Time taken in seconds to produce optimal/near optimal solution (for 3000 anneals) | | | | |
|---|---|---|---|---|---|---|---|---|---|---|---|---|---|---|---|
| Solver | P1 | P2 | P3 | P4 | P5 | P1 | P2 | P3 | P4 | P5 | P1 | P2 | P3 | P4 | P5 |
| Classical 1 (Qubovert's simulated annealing) | 0 | 2 | 4 | 9 | 6 | True | True | True | True | True | 39.715404 | 39.056720 | 34.292942 | 45.458702 | 41.843246 |
| Classical 2 (D-Wave's simulated annealing) | 0 | 1 | 4 | 10 | 7 | True | True | True | True | True | 5.914680 | 5.923613 | 5.597377 | 7.275560 | 6.837217 |
| Quantum annealing | 0 | 1 | 3 | 9 | 6 | True | True | True | True | True | 0.728034 | 0.728045 | 0.728034 | 0.728172 | 0.7281 |

Figure 9:
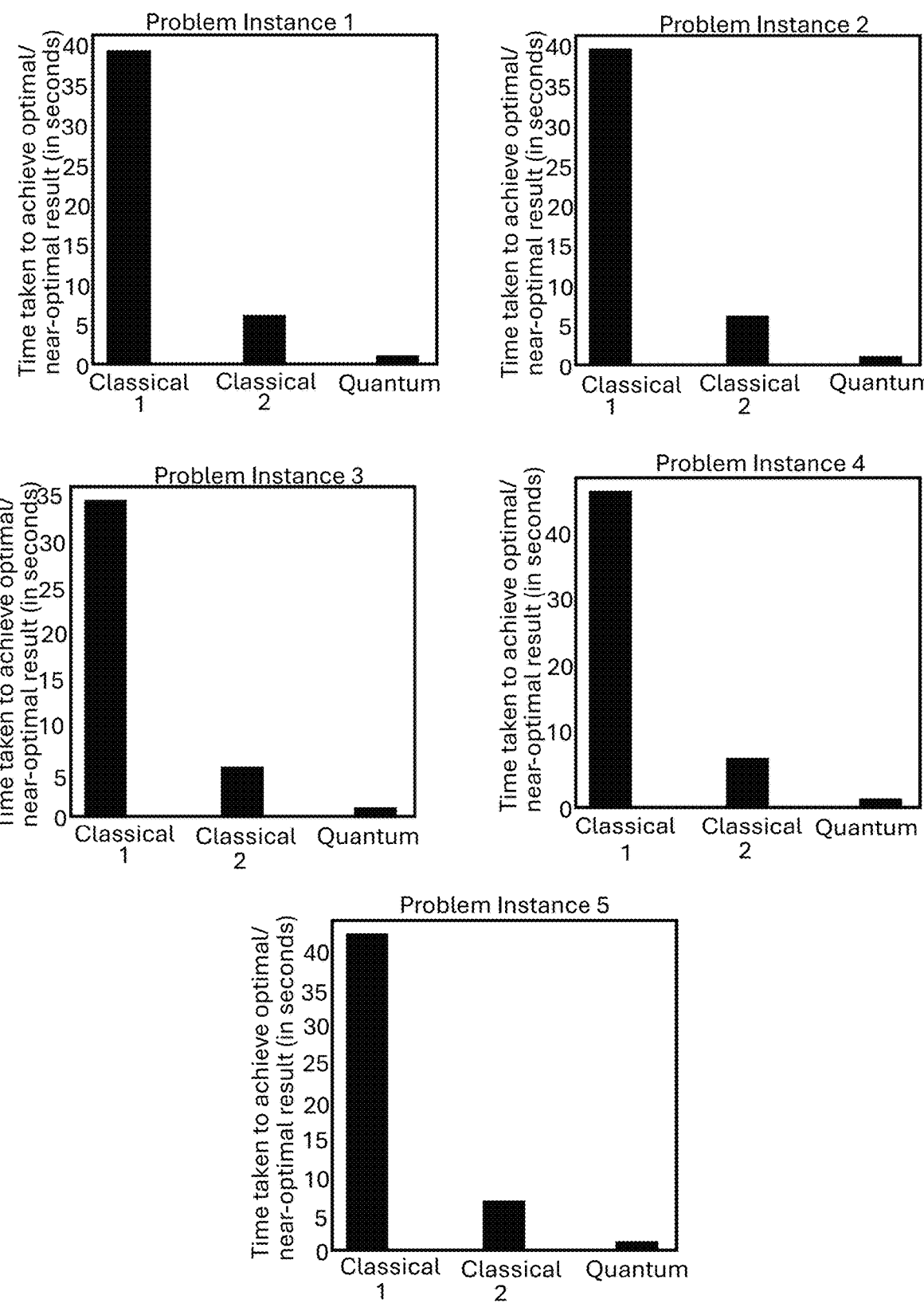
FIG. 9 shows time taken to complete a number anneals for a quantum annealing approach and a number of classical approaches.

It can be seen in the above table that the Qubovert's simulated annealing, D-Wave's simulated annealing and quantum annealing respectively produce similar results which are optimal in terms of solution quality (in other words, the violations to the aforementioned interference constraints are minimized). In FIG. 9, it can be seen that the quantum annealing approach is considerably shorter than the classical algorithms.

This shorter time to arrive at an optimal solution can be attributed to the quantum tunneling that occurs as part of the quantum annealing process, allowing the quantum annealing process to overcome local minima and converge to a global minima faster. In contrast, the simulated annealing algorithms take longer to overcome these local minima and converge to a global minima. Additionally, Qubovert's simulated annealing takes longer than D-Wave's simulated annealing, due to differences in parameter values of the algorithms, problem representation, the probability of accepting worse solutions, and cooling schedules. As noted above, the superposition, entanglement and quantum tunneling involved in the quantum annealing process together result in a significant improvement in the time required to find an optimal solution to the aforementioned channel allocation problem.

Figure 10:
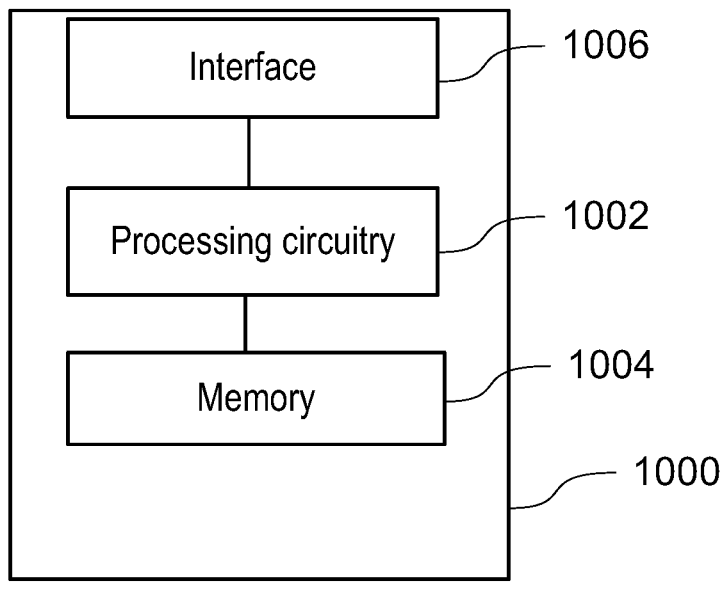
FIG. 10 is a schematic of an example of an apparatus 1000 for determining allocation of unmanned aerial vehicle (UAV) base stations in a wireless network.

It will be appreciated that by solving the aforementioned UAV base station and channel allocation problems according to embodiments of the present disclosure significantly reduce the data traffic at the base stations of the wireless network, thereby improving spectral efficiency, power efficiency, user data rate, coverage area, capacity per area and reducing transmission delay and cost in the wireless net- FIG. 10 is a schematic of an example of an apparatus 1000 for determining allocation of unmanned aerial vehicle (UAV) base stations in a wireless network. The apparatus 1000 comprises processing circuitry 1002 (e.g. one or more processors) and a memory 1004 in communication with the processing circuitry 1002. The memory 1004 contains instructions executable by the processing circuitry 1002. The apparatus 1000 also comprises an interface 1006 in communication with the processing circuitry 1002. Although the interface 1006, processing circuitry 1002 and memory 1004 are shown connected in series, these may alternatively be interconnected in any other way, for example via a bus.

In one embodiment, the memory 1004 contains instructions executable by the processing circuitry 1002 such that the apparatus 1000 is operable to express determination of allocation of resources for a plurality of wireless communication devices in the wireless network as a quadratic unconstrained binary optimization (QUBO) problem, and execute the QUBO problem on a quantum computing device to determine the allocation of resources to the plurality of wireless communication devices in the wireless network. In some examples, the apparatus 1000 is operable to carry out the methods 100, 200, 500 and 600 described above with reference to FIGS. 1, 2, 5 and 6.

Figure 11:
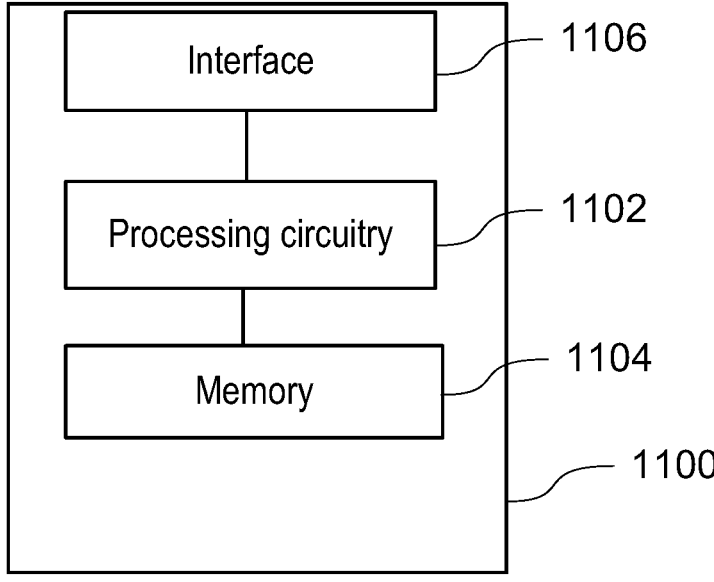
FIG. 11 is a schematic of an example of an apparatus 1100 for determining allocation of channels in a wireless network.

FIG. 11 is a schematic of an example of an apparatus 1100 for determining allocation of channels in a wireless network. The apparatus 1100 comprises processing circuitry 1102 (e.g. one or more processors) and a memory 1104 in communication with the processing circuitry 1102. The memory 1104 contains instructions executable by the processing circuitry 1102. The apparatus 1100 also comprises an interface 1106 in communication with the processing circuitry 1102. Although the interface 1106, processing circuitry 1102 and memory 1104 are shown connected in series, these may alternatively be interconnected in any other way, for example via a bus.

In one embodiment, the memory 1104 contains instructions executable by the processing circuitry 1102 such that the apparatus 1100 is operable to express determination of allocation of channels in the wireless network as a quadratic unconstrained binary optimization (QUBO) problem, and execute the QUBO problem on a quantum computing device to determine the allocation of channels in the wireless network. In some examples, the apparatus 1100 is operable to carry out the methods 300, 400, 500 and 600 described above with reference to FIGS. 3, 4, 5 and 6.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of determining allocation of unmanned aerial vehicle (UAV) base stations in a wireless network, the method comprising:

defining an integer programming linear (ILP) problem for allocation of UAV base stations to one or more wireless communication devices in the wireless network, wherein the ILP problem is a minimization problem of determining a respective subset of available UAV base stations in the wireless network so as to minimize a value of an objective function of the ILP problem, wherein the value of the objective function indicates a number of available UAV base stations to be allocated in the wireless network;

expressing determination of allocation of UAV base stations to the one or more wireless communication devices in the wireless network as a quadratic unconstrained binary optimization (QUBO) problem, which is the ILP problem; and executing the QUBO problem on a quantum computing device to determine the allocation of UAV base stations to the one or more wireless communication devices in the wireless network.

2. The method of claim 1, wherein determining allocation of UAV base stations comprises determining a minimum number of UAV base stations for serving the one or more wireless communication devices.

3. The method of claim 1, wherein the value of the objective function is based in part on characteristics of the respective subset of the available UAV base stations.

4. The method of claim 1, wherein the value of the objective function is based on one or more of the following: locations of the available UAV base stations, locations of the one or more wireless communication devices, and coverage radiuses of the available UAV base stations.

5. The method of claim 1, wherein the one or more wireless communication devices have resource requirements that cannot be met by the wireless network.

6. The method of claim 1, comprising allocating UAV base stations in the wireless network according to a result of executing the QUBO problem on the quantum computing device.

7. A method of determining allocation of channels in a wireless network, wherein each of the channels in the wireless network are useable for wireless communication between base stations and wireless communication devices in the wireless network, and wherein at least one of the base stations is an unmanned aerial vehicle (UAV) base station, the method comprising:

defining an integer programming linear (ILP) problem for allocation of channels in the wireless network, wherein the ILP problem comprises a minimisation problem of determining a respective subset of available channels in the wireless network to be assigned so as to minimise a value of an objective function for the ILP problem, wherein the value of the objective function indicates a number of violations on the interference constraints represented by a compatibility matrix C;

expressing determination of allocation of channels in the wireless network as a quadratic unconstrained binary optimization (QUBO) problem which is the ILP problem; and executing the QUBO problem on a quantum computing device to determine the allocation of channels in the wireless network.

8. The method of claim 7, wherein the compatibility matrix C represents one or more of:

a co-channel interference constraint, an adjacent channel interference constraint, and a co-site interference constraint.

9. The method of claim 7, wherein the objective function includes one or more constraints, including a first constraint whereby the respective subset of available channels in the wireless communication devices to be assigned must fulfil the demands of wireless communication devices in each of the coverage regions to be served by the respective subset of available channels.

10. The method of claim 7, comprising allocating channels in the wireless network according to a result of executing the QUBO problem on the quantum computing device.

11. The method of claim 10, wherein expressing the ILP problem as the QUBO problem comprises:

expressing the objective function and constraints of the ILP problem as a combination of binary variables;

computing a Lagrangian multiplier using coefficients of the objective function;

transforming one or more constraints of the objective function into equivalent quadratic penalty functions;

combining the expression containing only binary variables and the penalty functions into a single quadratic expression equivalent to the form xTOx; and determining the matrix Q from the quadratic expression, and wherein the binary variables in the expression containing only binary variables represent logical qubits in a problem graph for the quantum computing device.

12. The method of claim 11, wherein the step of transforming one or more constraints of the objective function into equivalent quadratic penalty functions comprises, for a linear inequality constraint:

adding one or more slack variables to the linear inequality constraint and expressing slack variable in terms of binary variables to convert the linear inequality constraint to a matrix equation form; and converting the matrix equation form to a quadratic penalty function.

13. The method of claim 11, wherein the step of transforming one or more constraints of the objective function into equivalent quadratic penalty functions comprises, for a non-linear inequality constraint:

finding the coefficients of each term present in the penalty function of the non-linear inequality constraint.

14. The method according to claim 7, wherein executing the QUBO problem on the quantum computing device comprises performing a quantum annealing process.

15. Apparatus for determining allocation of unmanned aerial vehicle (UAV) base stations in a wireless network, the apparatus comprising a processor and a memory, the memory containing instructions executable by the processor such that the apparatus is operable to:

define an integer programming linear (ILP) problem for allocation of UAV base stations to one or more wireless communication devices in the wireless network, wherein the ILP problem is a minimization problem of determining a respective subset of available UAV base stations in the wireless network so as to minimize a value of an objective function of the ILP problem, wherein the value of the objective function indicates a number of available UAV base stations to be allocated in the wireless network;

express determination of allocation of UAV base stations to the one or more wireless communication devices in the wireless network as a quadratic unconstrained binary optimization (QUBO) problem, which is the ILP problem; and execute the QUBO problem on a quantum computing device to determine the allocation of UAV base stations to a one or more wireless communication devices in the wireless network.

16. Apparatus for determining allocation of channels in a wireless network, wherein each of the channels in the wireless network are useable for wireless communication between base stations and wireless communication devices in the wireless network, and wherein at least one of the base stations is an unmanned aerial vehicle (UAV) base station, the apparatus comprising a processor and a memory, the memory containing instructions executable by the processor such that the apparatus is operable to:

define an integer programming linear (ILP) problem for allocation of channels in the wireless network, wherein the ILP problem is a minimization problem of determining a respective subset of available UAV base stations in the wireless network so as to minimize a value of an objective function of the ILP problem, wherein the value of the objective function indicates a number of available UAV base stations to be allocated in the wireless network;

express determination of allocation of channels in the wireless network as a quadratic unconstrained binary optimization (QUBO) problem, which is the ILP problem; and execute the QUBO problem on a quantum computing device to determine the allocation of channels in the wireless network.

17. The apparatus of claim 16, wherein the memory contains instructions executable by the processor such that the apparatus is operable to allocate channels in the wireless network according to a result of executing the QUBO problem on the quantum computing device.

* * * * *